United States Patent
Burr

(10) Patent No.: US 10,161,190 B2
(45) Date of Patent: Dec. 25, 2018

(54) DRILL BIT SEAL AND METHOD OF USING SAME

(71) Applicant: National Oilwell Varco, L.P., Houston, TX (US)

(72) Inventor: Bruce Hawley Burr, Willis, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 15/230,483

(22) Filed: Aug. 7, 2016

(65) Prior Publication Data

US 2016/0340980 A1 Nov. 24, 2016

Related U.S. Application Data

(63) Continuation of application No. 13/985,654, filed as application No. PCT/US2012/024042 on Feb. 7, 2012, now abandoned.

(60) Provisional application No. 61/444,296, filed on Feb. 18, 2011.

(51) Int. Cl.
*E21B 10/25* (2006.01)
*F16J 15/16* (2006.01)
*E21B 10/22* (2006.01)

(52) U.S. Cl.
CPC .......... *E21B 10/25* (2013.01); *F16J 15/162* (2013.01); *F16J 15/164* (2013.01); *E21B 2010/225* (2013.01)

(58) Field of Classification Search
CPC ... E21B 10/25; E21B 2010/225; F16J 15/162; F16J 15/165; F16J 15/164
See application file for complete search history.

(56) References Cited

U.S. PATENT DOCUMENTS

| | | | |
|---|---|---|---|
| 3,397,928 A | 8/1968 | Galle | |
| 3,467,448 A | 9/1969 | Galle | |
| 3,612,551 A | 10/1971 | Grabill | |
| 3,765,495 A | 10/1973 | Murdoch et al. | |
| 3,944,306 A | 3/1976 | Neilson | |
| 4,194,795 A | 3/1980 | Rife | |
| 4,428,588 A * | 1/1984 | Oelke | E21B 10/25 |
| | | | 175/371 |
| 4,619,534 A | 10/1986 | Daly et al. | |
| 5,402,858 A | 4/1995 | Quantz et al. | |
| 5,456,327 A | 10/1995 | Denton et al. | |
| 5,472,058 A | 12/1995 | Hooper et al. | |

(Continued)

OTHER PUBLICATIONS

PCT/US2012/024042 International Preliminary Report on Patentability dated Aug. 29, 2013 (9 p.).

(Continued)

*Primary Examiner* — Robert E Fuller
*Assistant Examiner* — Christopher J Sebesta
(74) *Attorney, Agent, or Firm* — Conley Rose, P.C.

(57) ABSTRACT

A seal for a rolling cutter drill bit is provided. The seal has a ring shaped seal body having an inside diameter and an outside diameter, and a mud lobe and a grease lobe extending from the inside diameter of the seal body. The seal body has an asymmetrical, longitudinal cross-section such that, when positioned in a seal groove of the drill bit and compressed therein under downhole pressure, the mud lobe is maintained in contact with a seal land of the seal groove. The seal body may be provided with a garter spring and/or a textured pattern.

20 Claims, 14 Drawing Sheets

(56) References Cited

U.S. PATENT DOCUMENTS

| | | | |
|---|---|---|---|
| 5,842,700 | A | 12/1998 | Fang et al. |
| RE36,452 | E | 12/1999 | Upton et al. |
| 6,033,117 | A | 3/2000 | Cariveau et al. |
| 6,123,337 | A | 9/2000 | Fang et al. |
| 6,173,964 | B1 * | 1/2001 | Bell ................... E21B 33/04 |
| | | | 277/554 |
| 6,176,330 | B1 * | 1/2001 | Burr ................... E21B 10/25 |
| | | | 175/371 |
| 6,196,339 | B1 | 3/2001 | Portwood et al. |
| 6,254,275 | B1 | 7/2001 | Slaughter, Jr. et al. |
| 6,264,367 | B1 | 7/2001 | Slaughter, Jr. et al. |
| 6,305,483 | B1 | 10/2001 | Portwood |
| 6,336,512 | B1 | 1/2002 | Siracki |
| 6,406,030 | B1 | 6/2002 | Fang et al. |
| 6,494,462 | B2 | 12/2002 | Dietle |
| 6,536,542 | B1 | 3/2003 | Fang et al. |
| 6,820,704 | B2 | 11/2004 | Mourik et al. |
| 7,036,613 | B2 | 5/2006 | Burr |
| 7,562,878 | B2 | 7/2009 | Dietle et al. |
| 2005/0056462 | A1 * | 3/2005 | Burr ................... E21B 10/25 |
| | | | 175/57 |
| 2006/0065445 | A1 | 3/2006 | Chellappa et al. |
| 2009/0232428 | A1 | 9/2009 | Lu |
| 2011/0187058 | A1 * | 8/2011 | Curry ................. E21B 10/25 |
| | | | 277/336 |
| 2011/0297448 | A1 * | 12/2011 | Lu ..................... E21B 10/25 |
| | | | 175/371 |

OTHER PUBLICATIONS

PCT/US2012/024042 International Search Report and Written Opinion dated Sep. 25, 2012 (12 p.).
Restriction Requirement dated Feb. 19, 2016, for U.S. Appl. No. 13/985,654 (7 p.).
Response to Restriction Requirement dated Feb. 19, 2016, for U.S. Appl. No. 13/985,654; Response filed Apr. 19, 2016 (8 p.).
Office Action dated May 17, 2016, for U.S. Appl. No. 13/985,654 (9 p.).
Canadian Office Action dated Aug. 15, 2014, for Canadian Application No. 2,827,207 (2 p.).

* cited by examiner

DRILL BIT SEAL AND METHOD OF USING SAME

CROSS-REFERENCE TO RELATED APPLICATIONS

This application is a continuation of U.S. application Ser. No. 13/985,654 filed Aug. 15, 2013, and entitled, "Drill Bit Seal and Method of Using Same," which is a 35 U.S.C. § 371 national stage application of PCT/US2012/024042 filed Feb. 7, 2012 and entitled, "Drill Bit Seal and Method of Using Same," which claims benefit of U.S. provisional patent application Ser. No. 61/444,296 filed Feb. 18, 2011, and entitled " Packing Resistant Lip Seal for Rock Bits," each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to drill bits for drilling a wellbore. The present disclosure is generally directed to seals, such as dynamic seals for roller cone drill bits, and, for example, a packing resistant radial lip seal that may be used on a relatively large diameter roller cone drill bit.

Sealed and lubricated earth boring drill bits have been in use in the oil well drilling industry for several decades. In order to help reduce the friction at the radial seal interface, a means of enhancing lubrication by trapping it at the sealing interface may be provided, as described for example in U.S. Pat. No. 4,619,534. In these designs, however, at a given operating RPM, as the diameter of the drill bit increases, the surface speed of the seal against its seal land may also increase such that, at the very large bit diameters common for motor bits, the sealing interface may be sliding against the seal land at quite high rates. It may also be important that a radial lip seal does not slide within its seal groove in order to maintain stability in operation. Otherwise, this can lead to rapid heating and early failure, especially if the seal is deformed with cutting packing into the seal groove. Therefore, a reliable way to lock the radial seal in place in the cutter groove may be useful. Disclosed herein is a device for hydrostatically locking a radial seal in place in the cutter of a rolling cutter drill bit. This device may be applicable to rolling cutter drill bits that drill boreholes 8-½ inches (21.59 cm) in diameter and to rolling cutter drill bits that drill large diameter boreholes of 12-¼ inches (31.11 cm) and larger in diameter.

Sealing large diameter bits may be challenging when providing radial cross-section elastomeric seals for drill bits of very large borehole diameters (e.g., about 12-¼ inches (31.11 cm) or greater). A 12¼ inch (31.11 cm) drill bit operating at 250 rpm may have a surface speed at the seal land of 3450 inches (87.6 m) per minute. Seal failures at the very high surface speeds may lead to new seal designs with reduced operating friction, as described for example in commonly owned U.S. Pat. No. 7,036,613, the entire contents of which are hereby incorporated by reference herein. This design may be intended for increasing drilling rates of penetration in some drilling application. However, in some cases, the flushing system intended to carry the drilled earth to the surface may become overwhelmed to the point that the drill cuttings become packed around the drill bit and pack into a seal groove area of the drill bit.

BRIEF SUMMARY

Disclosed herein is a sealed and lubricated rolling cutter earth boring drill bit including a drill bit seal, such as a packing resistant lip seal, and in particular a seal that, upon installation, provides one or more closed air gaps within the cutter. The seal is generally oval in shape, with its width greater than its thickness. The seal has cavities formed on its sides. When this seal is installed in a seal groove in the rolling cutter, the edges of each cavity on the sides and/or ends of the seal come in contact with the seal groove and form air gap volumes between the seal and walls of the seal groove in the cutter.

In some seals, there is at least one air gap volume on a mud side of the seal, and a second air gap volume on a grease side of the seal. Once installed, at atmospheric pressure these gaps form cavities on the sides of the seals. Upon installation of the rolling cutter upon the leg during assembly, the seal groove and these cavities form volumes, and the ratio of the mud side volume to the grease side volume of this seal is greater than about 2.5, and may be greater than about 2.766.

In at least one aspect, the disclosure relates to a seal of a rolling cutter drill bit, the drill bit having a bearing spindle and a rolling cutter with a seal groove therebetween (the drill bit advanceable into the earth by a downhole tool). The seal includes a ring shaped seal body having an inside diameter and an outside diameter. A mud lobe and a grease lobe extend from the inside diameter of the seal body. The seal body has an asymmetrical longitudinal cross-section such that, when positioned in the seal groove of the drill bit and compressed therein under downhole pressure, the mud lobe and grease lobe are maintained in contact with a seal land of the seal groove.

The body has a mud cavity extending into a mud side of the seal body and defining a mud area therein and a grease cavity extending into a grease side of the seal body and defining a grease area therein. The mud area may be greater than the grease area. A seal ratio of the mud area to the grease area may be greater than 2.5 or 2.67. The mud cavity and the grease cavity may be concave and/or polygonal. The mud lobe may have a pointed tip. A mud gap is provided between the mud lobe and a mud wall of the groove. A grease gap is provided between the grease lobe and a grease wall of the groove. The mud lobe and the grease lobe have a seal land gap therebetween. A mud ear and a grease ear may extend from the outside diameter of the seal body. The mud ear and the grease ear may have an air gap therebetween. Under the downhole pressure, the outer diameter of the seal body may be pressed against a bottom of the seal groove such that the air gap is reduced, the grease side of the seal body may be pressed against a grease wall of the seal groove, and/or a grease gap between the grease lobe and the grease wall of the seal groove may be reduced. The downhole pressure may be hydrostatic pressure, high hydrostatic pressure of greater than 1,000 kg/cm, and/or pressure from cuttings.

The seal may also include a spring, such as a garter spring, positionable in a spring cavity extending into the seal body. The spring cavity may extend into a grease side of the seal body. The seal body may have a mud cavity extending into a mud side of the seal body and defining a mud area therein and a grease cavity extending into a grease side of the seal body and defining a grease area therein. The seal body may include an elastomer, a rubber, fluorocarbon, perfluoroelastomer, and/or tetrafluoroethylene propylene. The seal may also include a textured surface on the inside diameter thereof, the textured surface having a plurality of textured ribs and a plurality of mud side lips.

In another aspect, the disclosure relates to a rolling cutter earth boring drill bit advanceable into the earth by a downhole tool. The drill bit includes at least one leg, a bearing spindle at a cutter end of the leg, a rolling cutter positionable about the bearing spindle with a seal groove therebetween, and a seal positionable in the seal groove. The seal includes a ring shaped seal body having an inside diameter and an outside diameter, a mud lobe and a grease lobe extending from the inside diameter of the seal body. The seal body has an asymmetrical longitudinal cross-section such that, when positioned in the seal groove of the drill bit and compressed therein under downhole pressure. The mud lobe and grease lobe are maintained in contact with a seal land of the seal groove.

The drill bit may include at least one cutting insert, at least one bearing (e.g., ball, floating, bushing, cantilever), and a spring. The drill bit has an end connectable to a downhole tool.

In yet another aspect, the invention relates to a method of sealing a rolling cutter drill bit (the drill bit having a bearing spindle and a rolling cutter with a seal groove therebetween and advanceable into the earth by a downhole tool). The method involves positioning a seal in the seal groove (the seal including a ring shaped seal body having an inside diameter and an outside diameter, a mud lobe and a grease lobe extending from the inside diameter of the seal body, the seal body having an asymmetrical longitudinal cross-section), exposing the drill bit to downhole pressure and maintaining the mud lobe and grease lobe in contact with a seal land of the seal groove as the seal is compressed in the seal groove of the drill bit under the downhole pressure.

Finally, in another aspect, the disclosure relates to a seal of a rolling cutter drill bit (the drill bit having a bearing spindle and a rolling cutter with a seal groove therebetween, the drill bit advanceable into the earth by a downhole tool). The seal includes a ring shaped seal body having an inside diameter and an outside diameter. The inside diameter has a textured surface thereon, the textured surface having central ridge with a mud side pattern and a grease side pattern. The mud side pattern has a plurality of ribs extending at an angle to a longitudinal axis of the seal body.

The mud side pattern may be different from the grease side pattern. The textured pattern may include a side lip on a mud side of the mud side pattern. The ribs may be at a 45 degree angle to the longitudinal axis of the seal body.

DETAILED DESCRIPTION

The description that follows includes exemplary systems, apparatuses, methods, and instruction sequences that embody techniques of the subject matter herein. However, it is understood that the described embodiments may be practiced without these specific details.

The present disclosure relates to a rolling cutter rock drill bit with a seal, such as a packing resistant type lip seal. The seal may be provided with an asymmetric configuration deformable within a seal groove of the drill bit under harsh conditions, such as downhole pressure (e.g., hydrostatic pressure, high hydrostatic pressure of greater than 1,000 kg/cm, and/or pressure from cuttings). The configuration may also be used to maintain a mud side lip of the seal in contact with a seal land of the seal groove. In some aspects, the seal may be provided with a spring to support the seal during operation, and/or a texturized pattern to trap lubricant and reduce running friction.

Figure 1:
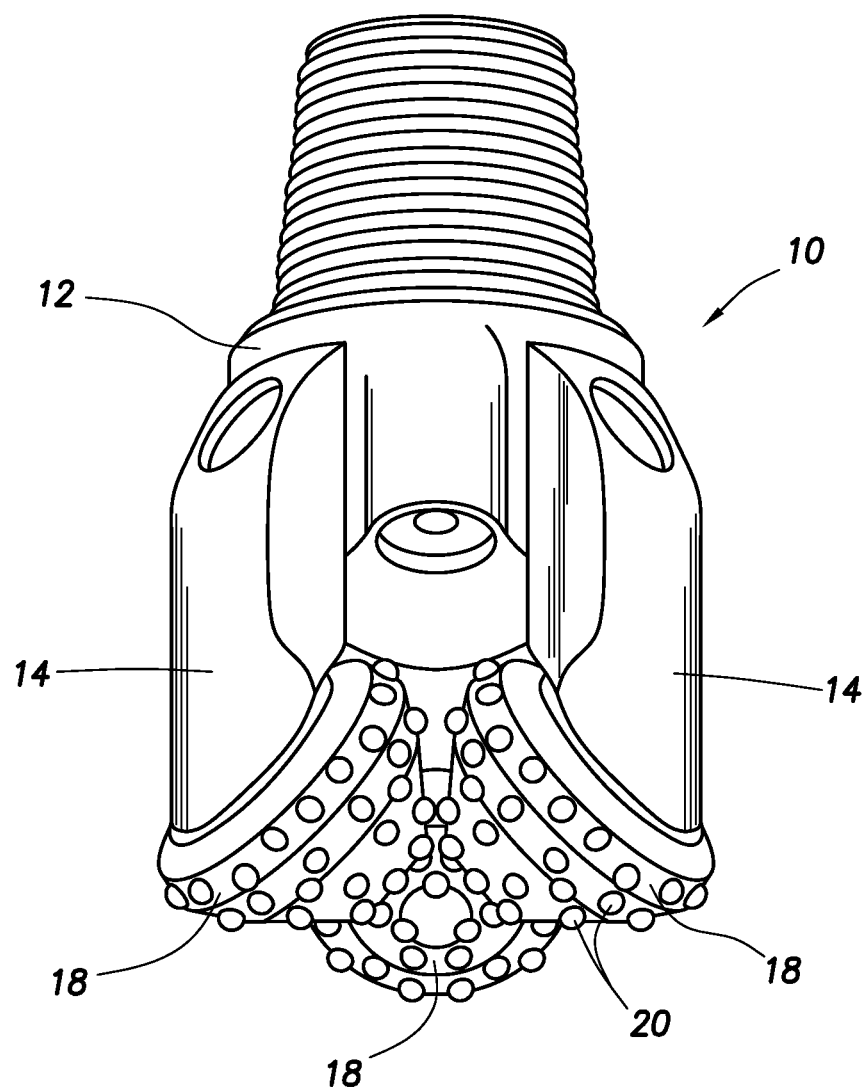
FIG. 1 shows a perspective view of a rolling cutter drill bit with a seal configuration known in the present disclosure.

Referring now to FIG. 1, illustrated is a rolling cutter drill bit 10. The rolling cutter drill bit 10 may be advanced into the earth by a downhole tool, such as a downhole drilling tool connectable to an uphole end of the drill bit 10. This drill bit 10 may also be called a rock bit, rolling cutter drill bit or just oilfield drill bit. The illustrated bit 10 includes a body 12 having three legs 14. This type of drill bit may have a cantilevered bearing spindle 16 (shown in a cross-sectional view of FIG. 2) formed on each leg 14 which extends inwardly and downwardly and is capable of carrying a rotatably mounted rolling cutter 18. Bearings 42 are arranged on the cantilevered bearing spindle 16 to support the rotatably mounted rolling cutter 18. Attached to each illustrated rolling cutter 18 are hard, wear-resistant cutting inserts 20, which are capable of engaging the earth to effect a drilling action and cause rotation of the rolling cutter 18.

The inserts 20 on the rolling cutters 18 crush and cut the rock as drilling operations are performed with the necessary force being supplied by, for example, "weight-on-bit" (WOB) which presses down on the drill bit 10, and by the torque applied by a rotary drive mechanism (or other downhole tool) connected to the drill bit 10. The bearings 42 of the rolling cutter 18 may be subjected to very irregular loads, with the instantaneous loading on the bearings 42 (and/or bearing 36, washer 46) being several times larger than the average bearing loads. During the drilling process, large and non-constant stresses and forces may be applied to the inserts 20, the rolling cutters 18, and the drill bit 10 itself. Thus, the loads carried by the internal bearings can be very large and irregularly applied.

A floating bushing bearing 36 may be mounted on the spindle 16 to carry these loads. The floating bushing bearing 36 is designed to carry radial loads imposed upon the rolling cutter 18 during drilling. Also shown are plurality of ball bearings 42 which serve to retain the rolling cutter 18 on the bearing spindle 16 by resisting forces which tend to push the rolling cutter 18 inward during drilling.

Figure 2:
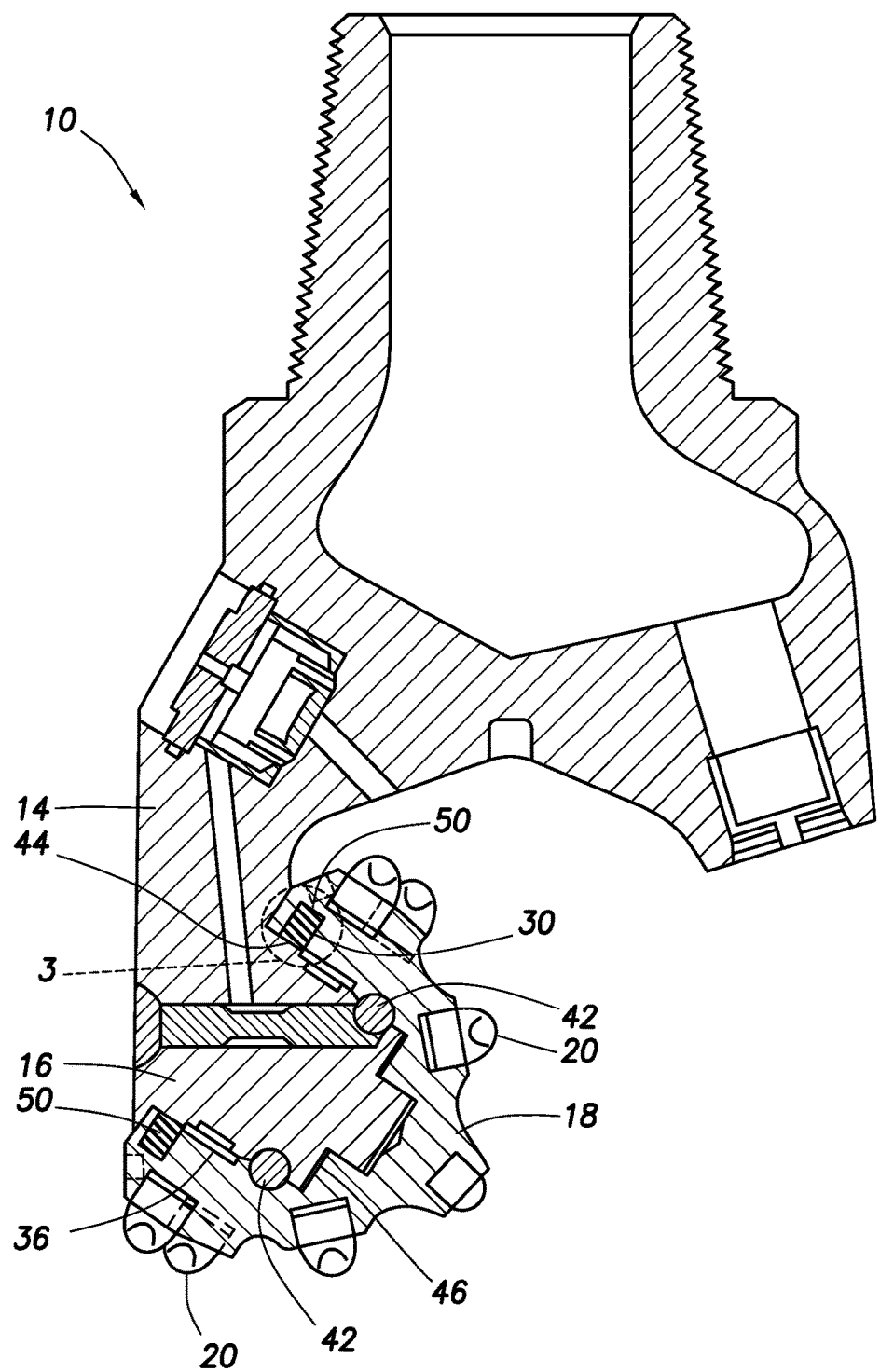
FIG. 2 is a cross-sectional view of a portion of the rolling cutter drill bit of FIG. 1.

A thrust face washer 46 may, or may not be between the bearing spindle 16 and the rolling cutter 18 as designs dictate. The thrust face washer 46 carries the onward thrust forces imposed upon the rolling cutter 18 during drilling. In operation, this thrust face washer 46 may float in a space between the bearing spindle 16 and the rolling cutter 18. It should be understood that the illustrative bearing configurations depicted in FIG. 2 are provided by way of example only, as the present subject matter may be employed with any type or configuration of bearings used in mounting the rolling cutter 18 on the spindle 16. Thus, the present subject matter should not be considered as limited to any particular arrangement or configuration of bearings.

As further indicated in FIG. 2, a drill bit seal 50 (e.g., a self-locking and packing resistant radial lip seal) of the present disclosure may be positioned in a seal recess 30 (or groove or gland) formed in the rolling cutter 18 and seal against a seal land 44 of the bearing spindle 16.

Figure 4:
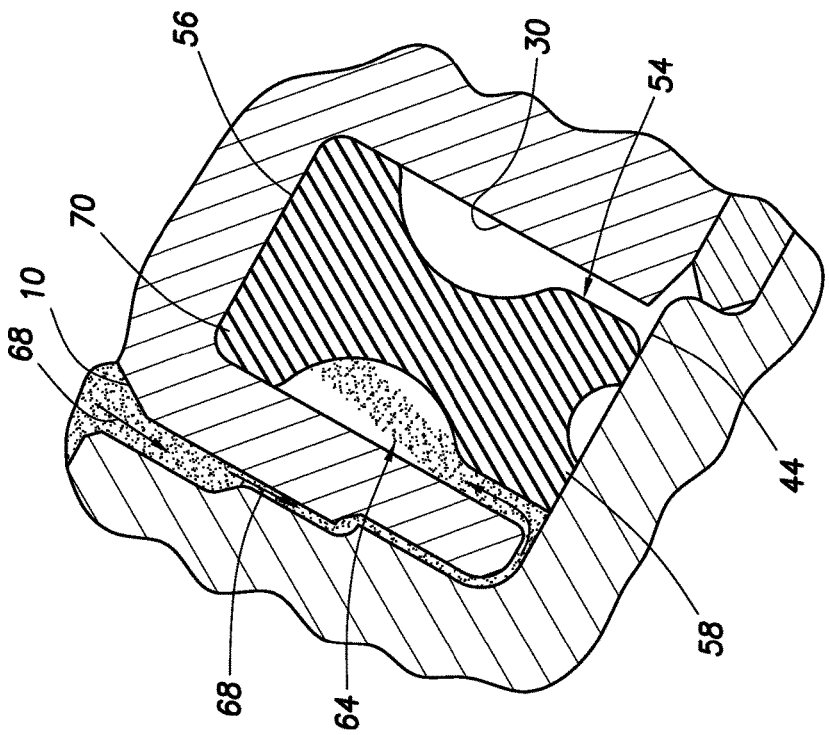
FIG. 4 shows the prior art lip seal and drill bit of FIG. 1 subjected to downhole pressure.
Figure 3:
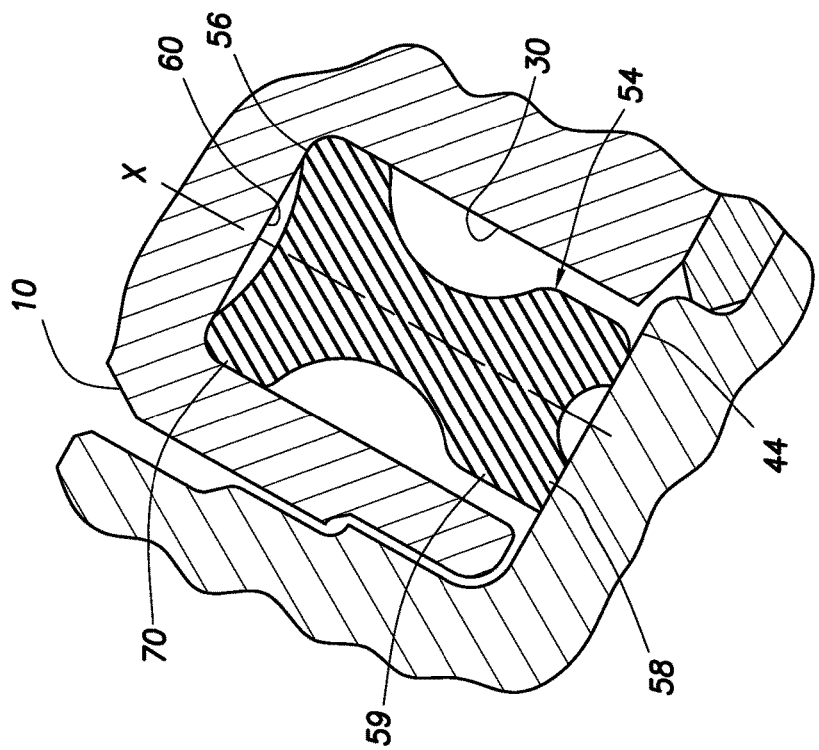
FIG. 3 is a schematic illustration shown in cross-section of a prior art lip seal installed in a rolling cutter drill bit at atmospheric pressure.
Figure 5:
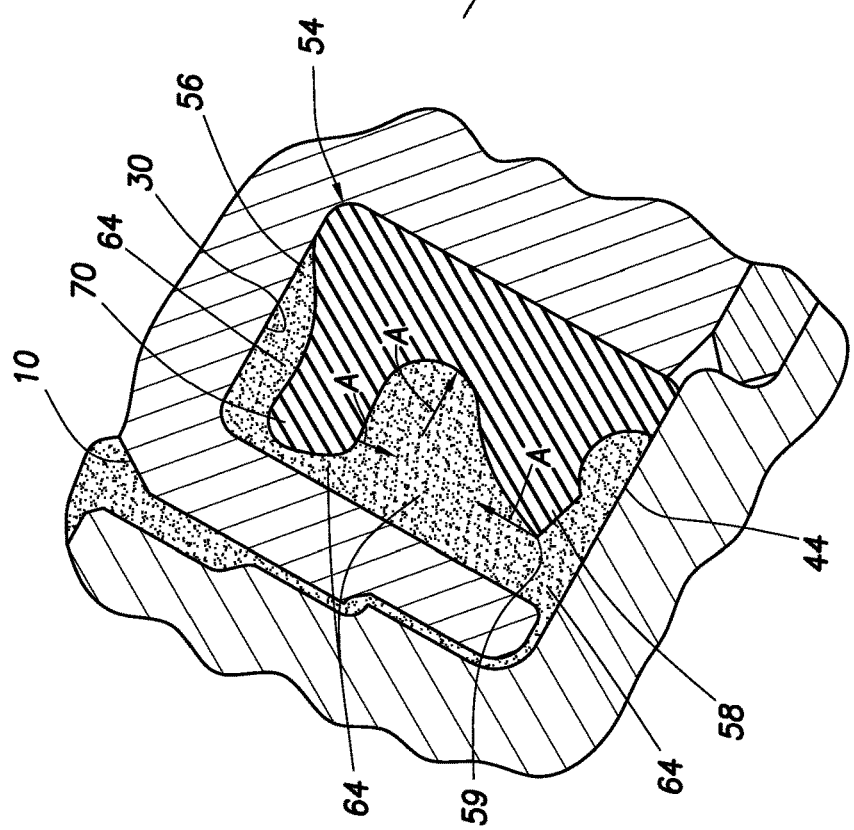
FIG. 5 shows the prior art lip seal and drill bit of FIG. 1 packed solid with drilled cuttings.

FIGS. 3, 4, and 5 are enlarged, partial cross-sectional views of a portion 3 of drill bit 10 of FIG. 2 having a lip seal 54 of the prior art in a groove 30 therein. These figures illustrate how the prior art lip seal 54 functions in comparison to the self-locking radial lip seal 50 of the present disclosure. As can be seen, the lip seal 54 of the prior art has an hourglass shape, which may be used to help the lip seal 54 to evenly apply loading to the sealing areas. However, this design may also provide a path for formation cuttings 64 to migrate around the back face portion of the cutter, by following the path of arrows 68, as shown in FIG. 4.

The prior art seals 54 are symmetrical along its longitudinal cross-section (about longitudinal axis X), and, when installed, they may be squeezed along their outside diameter 56 and inside diameter 58 such that the volume of the entire seal may be squeezed in compression. FIG. 3 shows an installed prior art lip seal 54 at atmospheric pressure, FIG. 4 shows an installed prior art lip seal 54 at downhole pressure (e.g., high hydrostatic pressure), and FIG. 5 shows an installed prior art lip seal 54 run at high hydrostatic pressure which has been packed solid with drilled cuttings 64. An air gap 60 may be formed along a concave surface on the outside diameter 56 at atmospheric pressure as indicated in FIG. 3. In operation, however, this air gap 60 may be squeezed out of existence under the high hydrostatic pressures (and/or cuttings) exerted on the seal 54 in operation as shown in FIG. 4. This may be a normal condition as operating downhole pressure, such as hydrostatic pressures exceeding about 15,000 psi (1054.9 kg/cm) or greater than about 1000 kg/cm are not unheard of in operation. Such downhole pressures may assure a non-elastic fluid system.

When drilling at very high drilling rates, it may be very difficult to control the build-up of the drilling cuttings in the drilling mud. Therefore, the tendency may be to tolerate high levels of drilled solids in the drilling mud—particularly with large diameter, say 12¼ inch (31.11 cm) boreholes, and larger. This may also affect how drill bits, and particularly, large diameter rolling earth boring drill bits behave in operation. In particular, the high solids content of the drilling mud may tend to cause the drill debris to pack in the seal groove of the drill bit and further help to cause premature failure of the seal. In some cases, cuttings 64 generated during the drilling process could became trapped around the seal 54 as shown, for example, about the prior art seal 54 of FIG. 4. This condition may be associated with failure of the seals 54. In these prior art seals 54, a mud side lip 59 (or seal lip) along the inside diameter 58 may be pulled out of contact with a seal land 44 of the drill bit. Once this occurs, failure of the seal 54—and so also the entire bit 10—may follow.

As can be seen in this sequence, the prior art lip seal 54 may become so packed in that the seal lip 59 may be pulled up and back away from the seal land 44. This packing may happen due in part to the symmetric hourglass shape of the prior art lip seal 54, which may cause the lip seal 54 to deform into a piston like device as mud side lip 59 and mud side corner 70 are pulled inward in the directions of arrows 'A' in FIG. 5.

Figure 6:
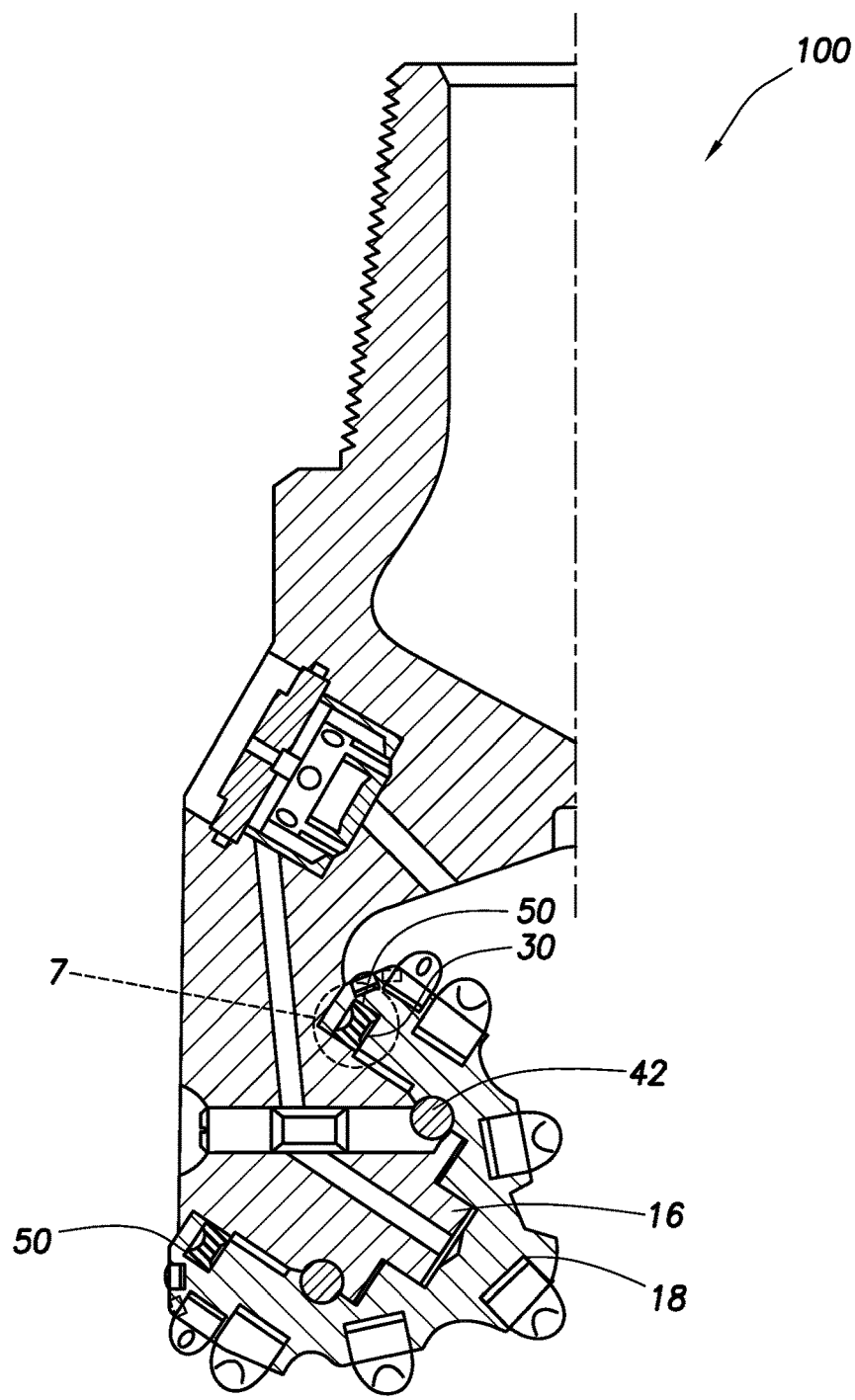
FIG. 6 shows a cross-sectional view of a drill bit of FIG. 1 with a drill bit seal in accordance with the present disclosure.

The drill bit seal 50 (e.g., a packing resistant radial lip seal) of the present disclosure installed in a rolling cutter drill bit 100 is shown in FIGS. 6-11C. This drill bit seal 50 has an asymmetric cross-section configured to prevent, for example, a loss of seal under downhole pressure (e.g., high pressures and high levels of cuttings). FIG. 6 is a general view of a drill bit 100 of the present disclosure showing the location of the seal 50 therein. The drill bit 100 may be the same as the drill bit 10 of FIGS. 1 and 2, having the spindle 16, rolling cutter 18, seal groove 30 and bearings 42. The seal 50 is mounted in the generally rectangular seal groove 30.

Figure 7:
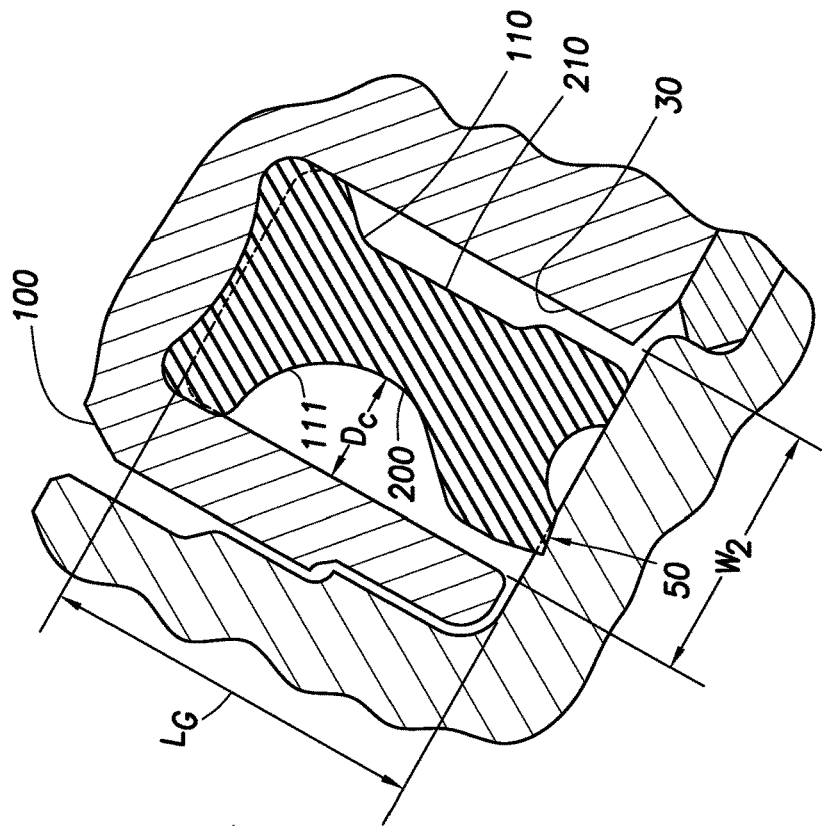
FIGS. 7-10 show cross-sectional views of a portion of the drill bit of FIG. 5 illustrating various operating conditions of the seal of the present disclosure.

A portion 7 of the drill bit 100 and the seal 50 of FIG. 6 is schematically shown in more detail in FIGS. 7-11C. In FIG. 7, the general shape of an uninstalled seal 50 is shown overlaid over a cross-sectional view of the seal groove 30. As shown in this view, the uninstalled and uncompressed seal 50 is larger than the seal groove 30, and must be compressed to fit therein.

Referring still to FIG. 7, the seal 50 may have no particular symmetry. The unconstrained cross-sectional shape of the seal 50 does not necessarily require symmetry. The asymmetric cross-section of the seal 50 is shown in FIG. 7. A depth $D_c$ of the concave mud cavity 200 of the face of a mud side 111 of the seal 50 occupies about one-half to about two-thirds of the width $W_2$ of the seal. The Length $L_1$ of this concave mud cavity 200 may be about three-fourths of a length $L_G$ of the groove 30. A lubricant (or grease) side 110 of the seal 50 may also have a generally dish-shaped grease cavity 210 of about the same length.

Figure 8:
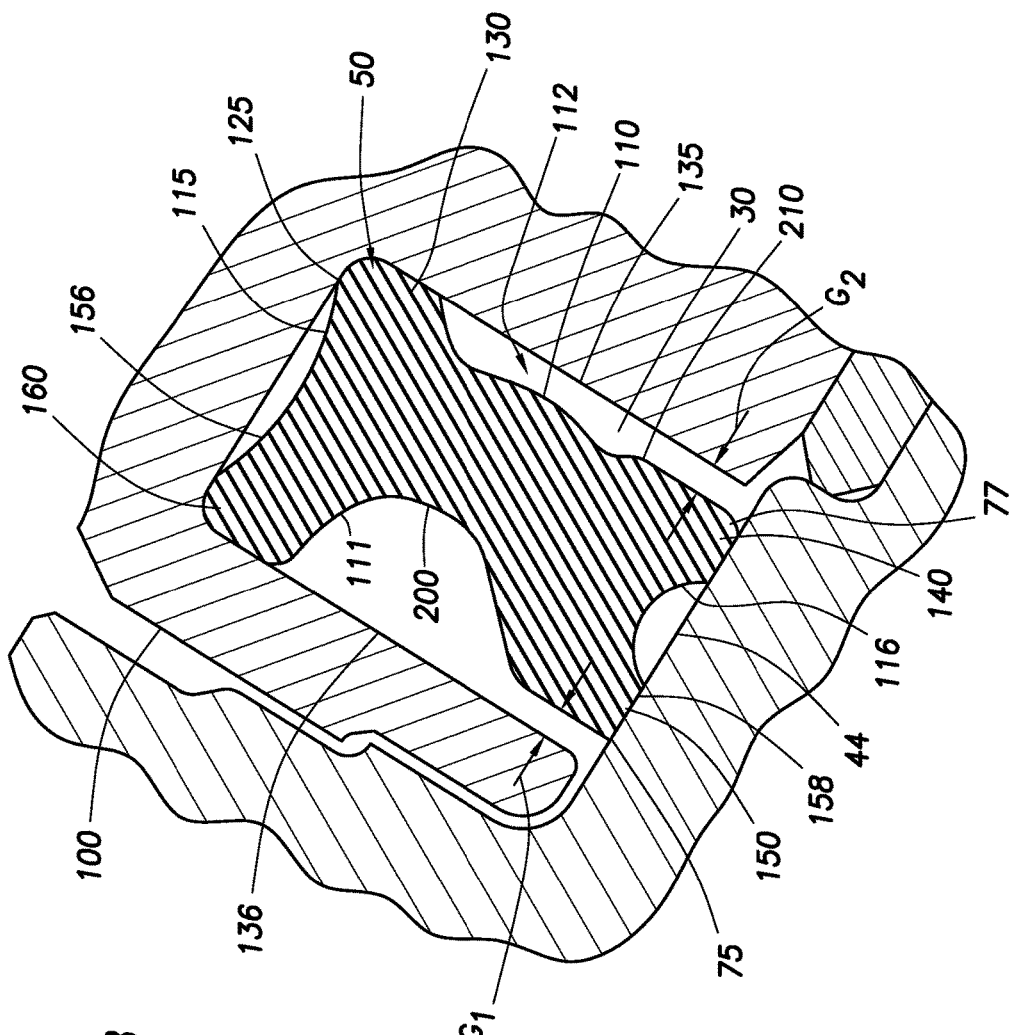

In FIG. 8, the seal 50 is shown compressed in the groove 30 at atmospheric pressure. Note that there is an 'air' gap 115 on the outside diameter 156 of the seal 50, and a grease side 110 of the seal 50 has bucked outwardly into the grease side cavity 210, as generally indicated by numeral 112. A lubrication groove 116 is positioned along the inner diameter 158 between a mud lobe (or mud lip) 150 and a grease lobe (or grease lip) 140.

Figure 9:
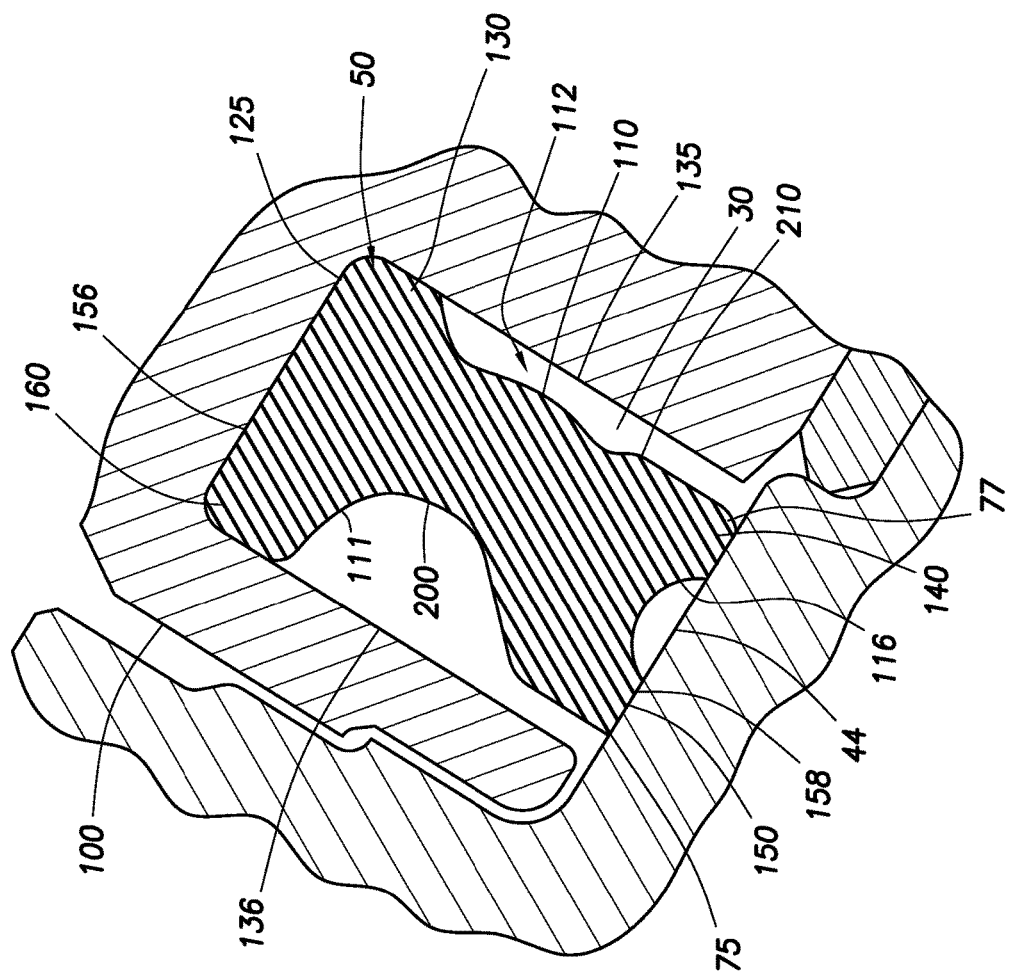

As further illustrated in FIGS. 8 and 9, the inside diameter 158 of the seal 50 may have lobes 140 and 150 engaging seal land 44, and grease ear 130 and mud ear 160 engaging a base 125. The mud lobe 150 may have a pointed tip 75 and the grease lobe 140 may have a rounded tip 77. Either lobe 140 or 150 may have a variety of shapes, such as rounded, pointed, etc. The mud ear 160 has an interference fit with mud wall 136, and grease ear 130 has an interference fit with grease wall 135. A mud gap G1 is provided between mud lobe 150 and the mud wall 136, and a grease gap G2 is provided between grease lobe 140 and grease wall 135.

Figure 10:
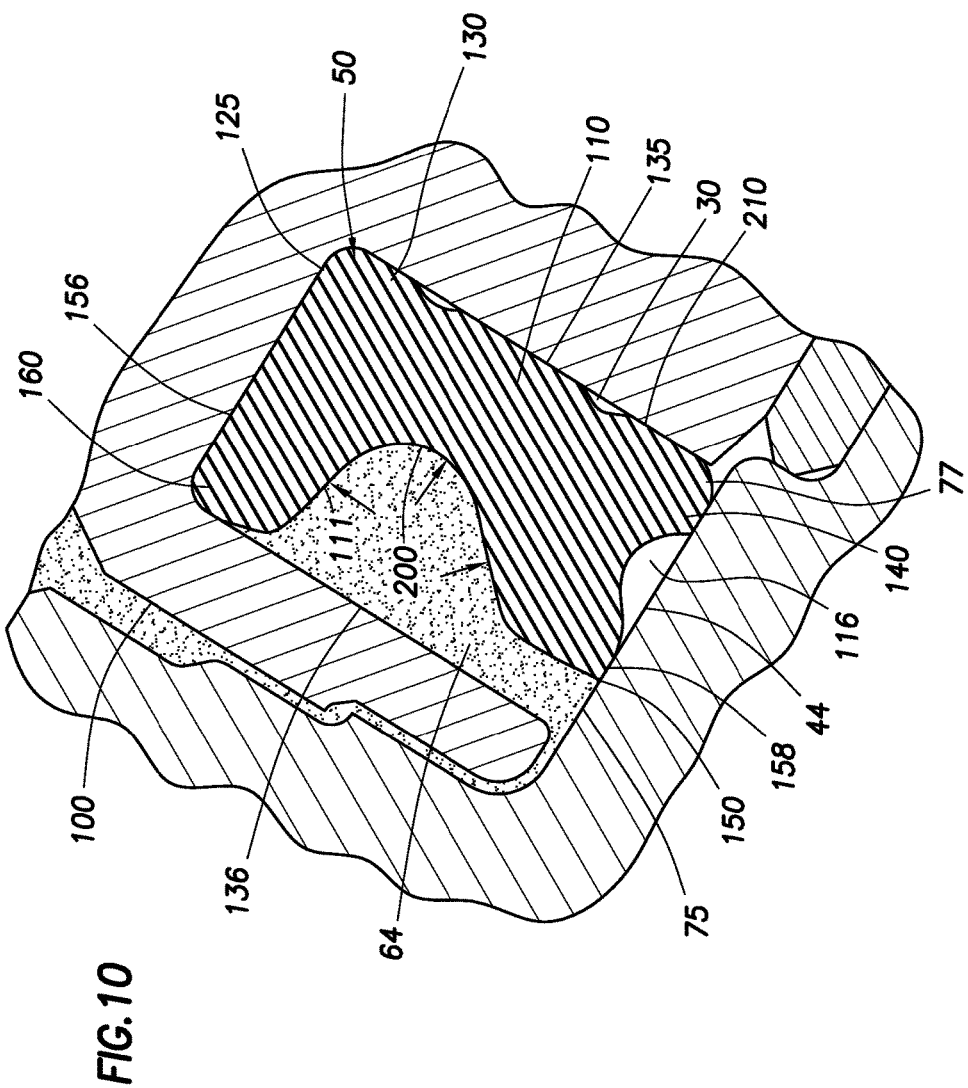

The asymmetry of the seal 50 may provide advantages for this seal design. Functionally, the concave mud side cavity 200 adjacent mud side 111 in the seal 50 may allow the seal 50 to fill with earthen cuttings and try to cause them to pack. But, as can be seen in FIGS. 9 and 10, the groove 30 on the grease side 110 of the seal 50 provides space for the seal 50 to move into as it gets packed with cuttings 64 on the mud side. The space on the grease side 110 may be smaller than space on the mud side 111 of the seal 50.

In operation under downhole pressure as shown in FIG. 9, the hydrostatic pressure of the environment causes the outside diameter 156 about air gap 115 to make full contact with a base 125 at the bottom of the seal groove 30 opposite the seal land 44. When maintained against the seal land 44, the mud lobe 150 may provide a barrier to prevent passage (or intrusion) of fluids and/or cuttings (or other abrasive particles). As also shown in FIG. 9, when the seal 50 is in the seal groove 30 and is operated at the very high hydrostatic pressures often seen in downhole drilling, the seal 50 assumes a 'wrinkled' appearance caused by a small amount of rubber deflection, and a small amount of buckling caused by increased stiffness due to the compression of the seal 50. A grease side wall (or grease wall) 135 on the 'grease' side 110 may be close to and substantially parallel to the grease side 110 so that any small inward pressure on the seal 50 due to cutting encroachment may be resisted by the contact between the grease side 110 and the grease wall 135.

The asymmetric shape of the seal 50 may cause it to have a non-uniform, biased load upon it. A central area of the seal 50 is arranged to provide more load in the inner lip (or grease lobe) 140 than the outer lip (or mud lobe) 150. This biased load may enhance the sealing ability of the inner lip 140 while reducing the wear on the outer exclusion lip 150 by reducing its contact force. The shape of the mud cavity 200 above the outer lip 150 will be 'energized' by the packing of the cuttings to better prevent intrusion of cuttings under the outer lip 150 as shown in FIG. 10. In a similar manner, the same effect will act on the outside diameter of the mud side 'ear' 160.

The seal 50 may be comprised of a variety of materials, e.g., an elastomeric material that, in one embodiment, may have a Shore A hardness ranging from approximately 60-90 durometer. However, it is also within the scope of this disclosure to make the seal 50 from fluorocarbon or any other suitable resilient sealing material.

Therefore, disclosed herein is a sealed and lubricated rolling cutter earth boring drill bit 100 comprising a seal 50, wherein the seal 50, upon installation, comprises one or more air gaps (e.g., mud cavity 200, grease cavity 210, air gap 115 and/or lubrication groove 116) at atmospheric pressure which, when exposed to a high pressure drilling environment, closes the trapped void space around the outside diameter 156 of the seal 50.

Figure 11B:
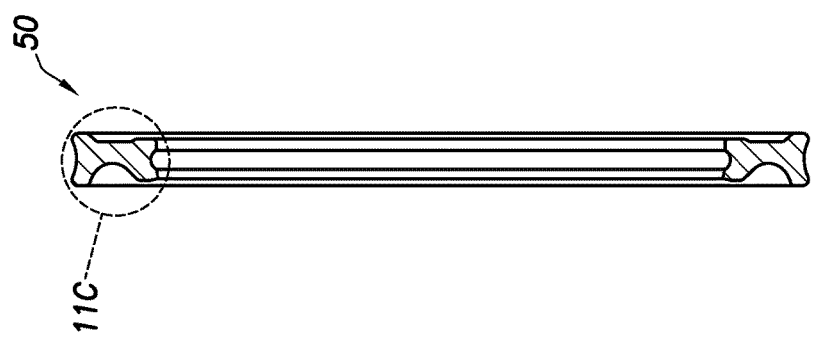
FIGS. 11A-11C depict plan, cross-sectional and detailed views, respectively, of another drill bit seal.
Figure 11A:
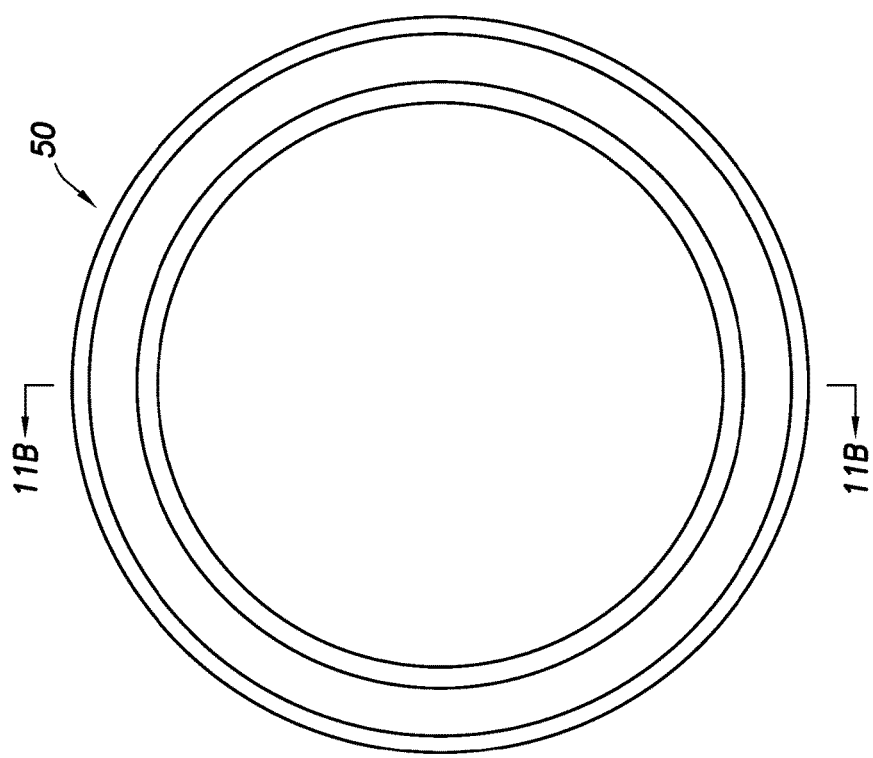
Figure 11C:
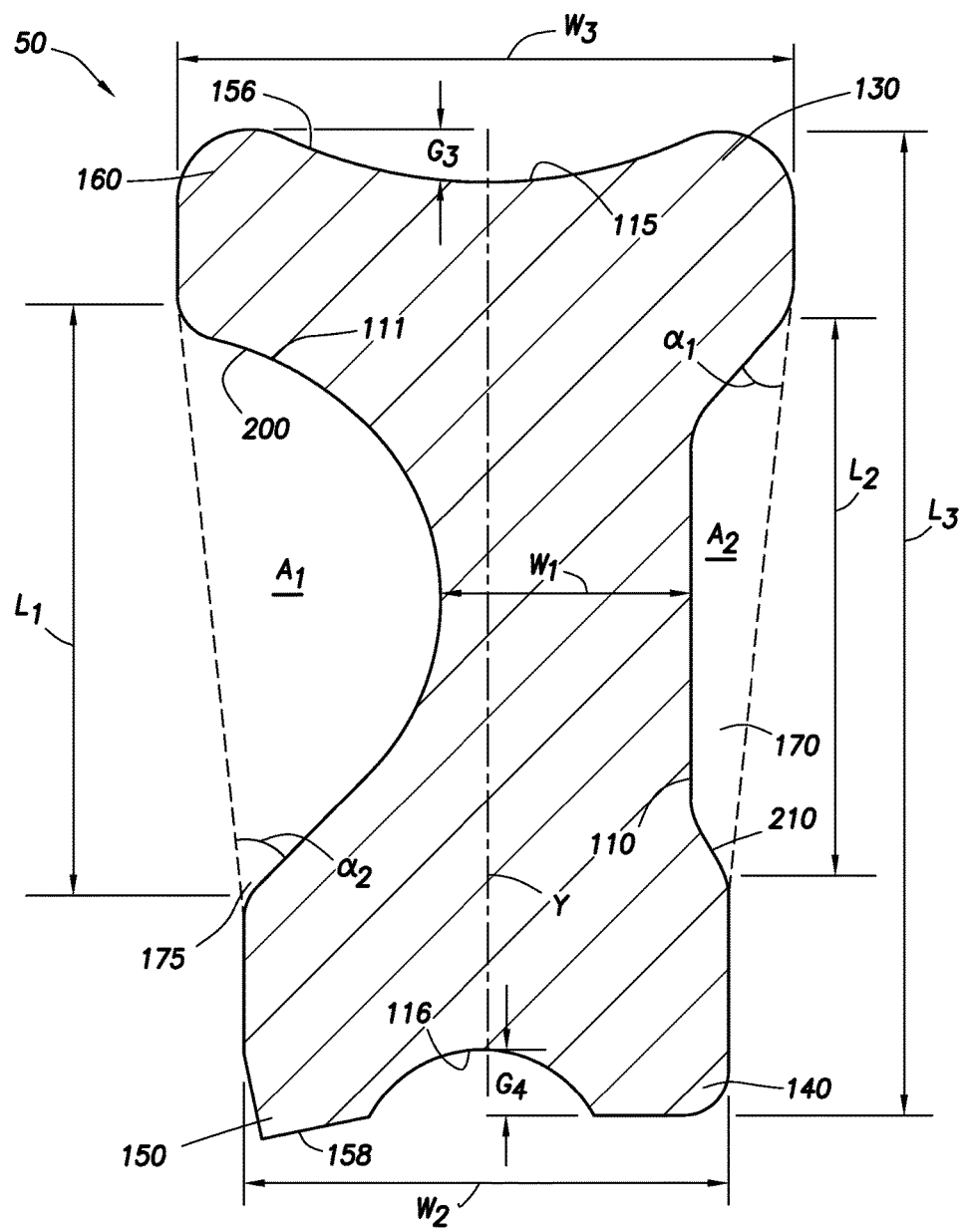

Referring now to FIGS. 11A-11C, the seal 50 is shown in greater detail. As shown in these figures, the seal 50 has an asymmetric configuration along its longitudinal cross-section (about longitudinal axis Y). FIG. 11A shows a plan view of the seal 50. FIG. 11B shows a cross-sectional view of the seal 50 of 11A taken along line 11B-11B. FIG. 11C is a detailed view of section 11C of the seal 50 of FIG. 11B. Example dimensions for the seal 50 are shown in FIG. 11C.

The dimensions of the seal 50 may be adjusted to provide desired sealing capabilities. For example, a horizontal width $W_3$ of the seal at a base end, a horizontal width $W_2$ at a land end, and a horizontal width $W_1$ at an intermediary position may be defined. Vertical lengths $L_1$ of the mud cavity 200, $L_2$ of the grease cavity 210 and $L_3$ of the seal 50 may also be defined. Other dimensions, such as mud cavity angle $\alpha_2$ and grease cavity $\alpha_1$ may also be defined. A depth $G_3$ of air gap 115 and depth $G_4$ of lubrication groove 116 may also be defined. By way of example, the seal 50 may have a width $W_2$ of about 6.3 mm, $W_1$ of about 3.15 mm, and $W_3$ of about 8 mm; length $L_1$ of about 7.54 mm, $L_2$ of about 7.09 mm, and $L_3$ of about 12.67 mm; angle $\alpha_1$ and $\alpha_2$ of about 45 degrees; and gaps $G_1$ and $G_2$ of about 0.76 mm, $G_3$ of about 0.64 mm, and $G_4$ of about 0.86 mm.

The width $W_3$ of the seal 50 at the mud ear 160 and grease ear 130 may be greater than a width of the seal groove 30 to prevent passage of fluid and/or particles into the air gap 115. The width $W_1$ along a central portion of the seal 50 may be from about 40 to about 50 percent of the width $W_2$. The widths $W_1$ and $W_2$ may be selected to define the desired contact force of the seal 50 during operation. The lengths $L_1$ and $L_2$ of the cavities 200 and 210 may be substantially the same and may be from about 55 to about 80 percent of the length $L_3$ of the seal. The inside diameter 158 and outside diameter 156 may be centered along axis Y to provide gaps $G_1$ and $G_2$ for freedom of movement along the inside diameter 158 (gaps $G_1$ and $G_2$ are shown in FIG. 8). Gaps $G_1$ and $G_2$ may be from about 10 to about 20 percent of the width $W_2$, and gap $G_1$ may be about the same as gap $G_2$.

As shown in FIG. 11C, the mud side 111 and grease side 110 volumes depicted as cross-sectional areas $A_1$, $A_2$ defined by cavities 200, 210 formed on the sides 111, 110 of the seal 50 of the present disclosure are illustrated. In addition, the relationship of the mud side 'overhang' 175 and the grease side 'overhang' 170 of seal lobes 140, 150 may be described as a ratio $A_1/A_2$. In order to provide the benefits as described above, the shape and design of the lobes may be adjusted such that the ratio of the areas $A_1/A_2$ is greater than or equal to about 2.5. In some cases, the ratio may be greater than or equal to about 2.766.

Figure 12B:
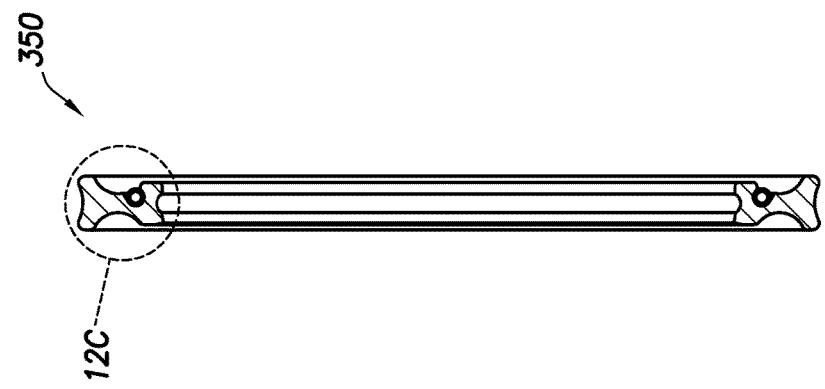
FIGS. 12A-12C depict plan, cross-sectional and detailed views, respectively, of an alternate drill bit seal provided with a seal spring.
Figure 12A:
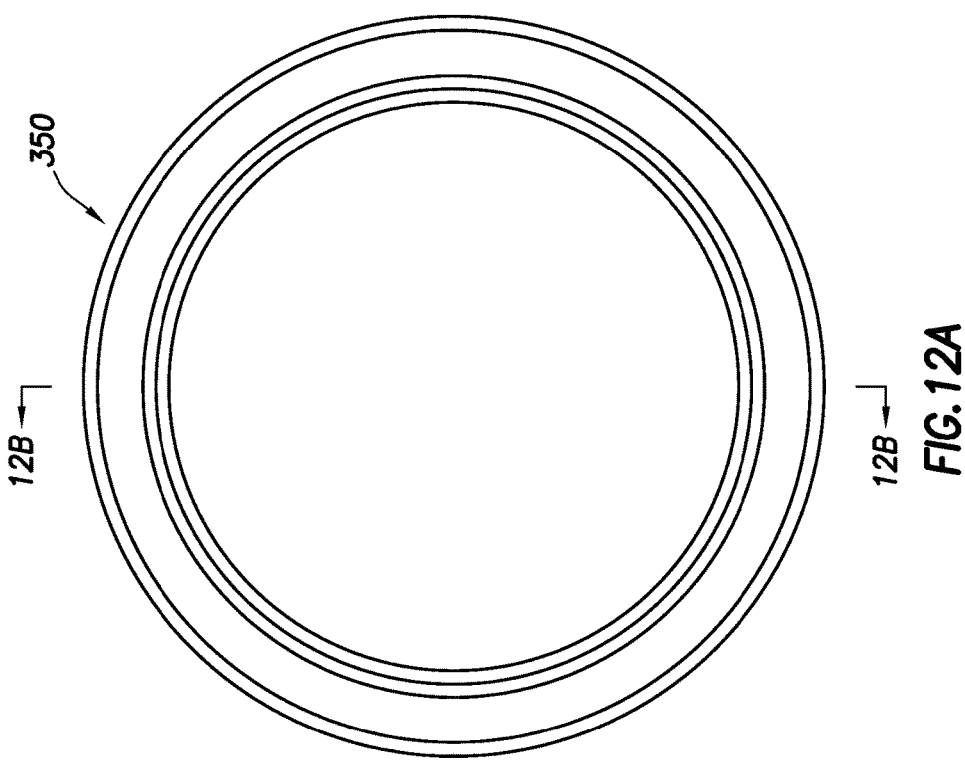
Figure 12C:
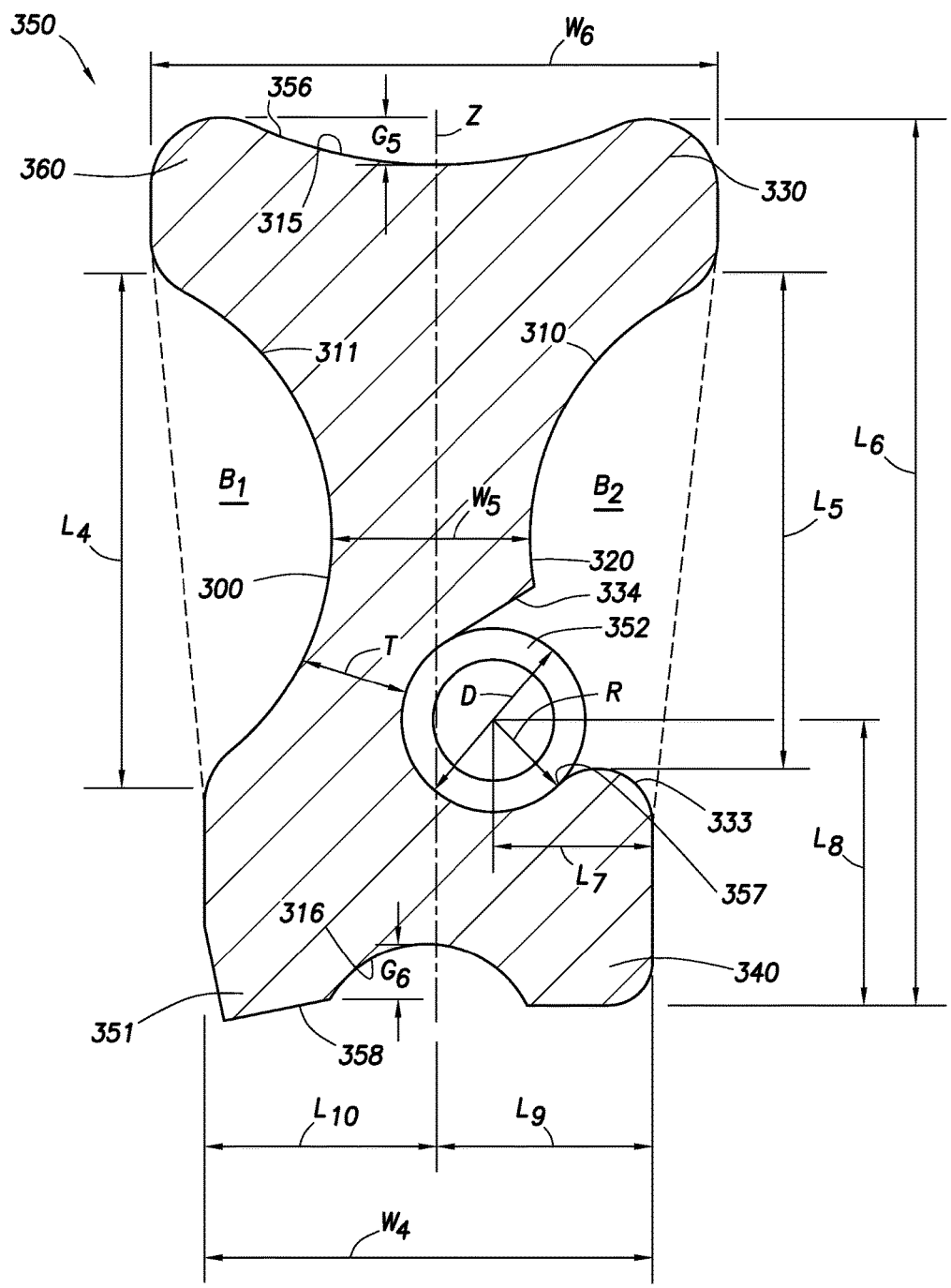

FIGS. 12A-12C depict an alternate seal 350 having an asymmetric configuration along its longitudinal cross-section (about longitudinal axis Z). FIG. 12A shows a plan view of the seal 350. FIG. 12B shows a cross-sectional view of the seal 350 of 12A taken along line 12B-12B. FIG. 12C is a detailed view of section 12C of the seal 350 of FIG. 12B. Example dimensions for the seal 350 are shown in FIG. 12C. In this version, the seal 350 is provided with a spring 352 extending into a grease side 310 adjacent cavity 320 for reinforcement during operation.

The seal 350 has a mud lobe 351, a grease lobe 340, a mud ear 360, a grease ear 330, an air gap 315, a lubrication groove 316, a mud side 311, a grease side 310, an inside diameter 358 and an outside diameter 356. The mud side 311 may have a cavity 300 having an area $B_1$ and the grease side 310 may have a grease cavity 320 having an area $B_2$. The areas $B_1$ and $B_2$ (excluding the spring pocket 357 and spring 352) may be substantially the same. The mud ear 360 and the grease ear 330 may be symmetric about the axis Z.

The dimensions of the seal 350 may be adjusted to provide desired sealing capabilities. For example, a horizontal width $W_6$ of the seal at a base end, a horizontal width $W_4$ at a land end, and a horizontal width $W_5$ at an intermediary position may be defined. Vertical lengths $L_4$ of the mud cavity 300, $L_5$ of the grease cavity 210 and $L_6$ of the seal 350 may also be defined. Other dimensions, such as depth $G_5$ of air gap 315 and a depth $G_6$ of lubrication groove 316 may also be defined. By way of example, the seal 350 may have a width $W_4$ of about 6.3 mm, $W_5$ of about 3.15 mm, and $W_6$ of about 8 mm; length $L_4$ of about 7.34 mm, $L_5$ of about 7.21 mm, $L_6$ of about 12.45 mm, and $L_9$ of about 3.15 mm; and gaps $G_5$ of about 0.64 mm, and $G_6$ of about 0.86 mm.

As shown in FIG. 12C, the mud side and grease side volumes depicted as cross-sectional areas $B_1$, $B_2$ defined by cavities 300, 320 formed on the sides 311, 310 of the seal 350 of the present disclosure are illustrated. The spring 352 may be, for example, a garter spring. The spring 352 may extend into a spring pocket 357 positioned between the vertical centerline Z of the seal 350 and the grease lobe 340. The spring 352 may be used to help energize the seal during operation.

The spring pocket 357 may have a generally round shape extending through the grease side 310 of the seal 350. A shoulder 333 (or spring retainer) along the grease side 310 may be positioned about an opening 334 to the spring pocket 357. The garter spring 352 may be positioned, under tension, in the spring pocket 357. The garter spring 352 may reinforce the seal 350 to maintain a sealing contact force thereof. The sealing contact force may be the force applied to the bearing spindle 16 and the cutter drill bit 18 by the seal 350. To provide a cantilever to the seal 350 for supporting the seal in sealing contact, the garter spring 352 may be positioned below a horizontal midpoint of the seal 350 and to the right of centerline Z. The position of the garter spring 352 in the seal 350 may be used to direct most of the sealing contact force towards the inside diameter of the seal 350.

In this version an area $B_1$ of the mud cavity 300 is about the same size and shape as the area $B_2$ of the grease cavity 310. Also, the spring pocket 357 has a radius R corresponding with the outer diameter D of the spring 352. A center of the spring 352 in position within the spring pocket 357 is positioned at a length $L_8$ from the land end and a length $L_7$ from a centerline of the seal 350. A length $L_9$ may be defined from the centerline Z to a grease side of the grease lobe 350, and a length L10 may be defined from the centerline Z to a mud side of the mud lobe 351. A thickness T may be defined between the spring pocket 357 and the mud cavity 300. The spring 352 sits below a horizontal centerline of the seal 350. By way of example, the seal 350 may have a radius R of about 1.27 mm; and a length $L_8$ of about 3.94 mm and $L_7$ of about 2.29 mm.

The length $L_8$ may be from about 20 to about 40 percent of $L_6$, and $L_7$ may be from about 50 to about 90 percent of $L_9$. The thickness T may be substantially less than the width $W_5$ (e.g., about 50 percent).

Figure 13A:
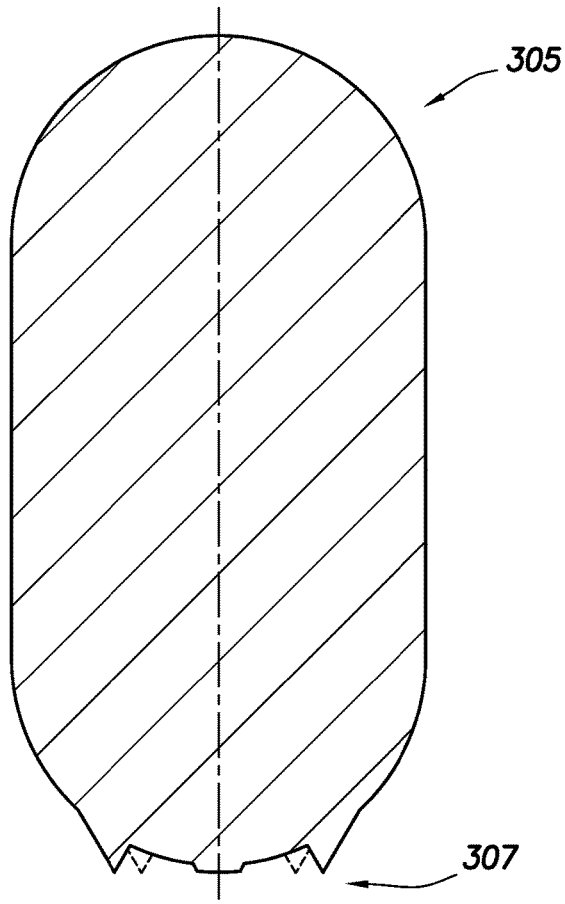
FIGS. 13A-13B depict cross-sectional and end schematic views, respectively, of a prior art drill bit seal having a textured surface.
Figure 13B:
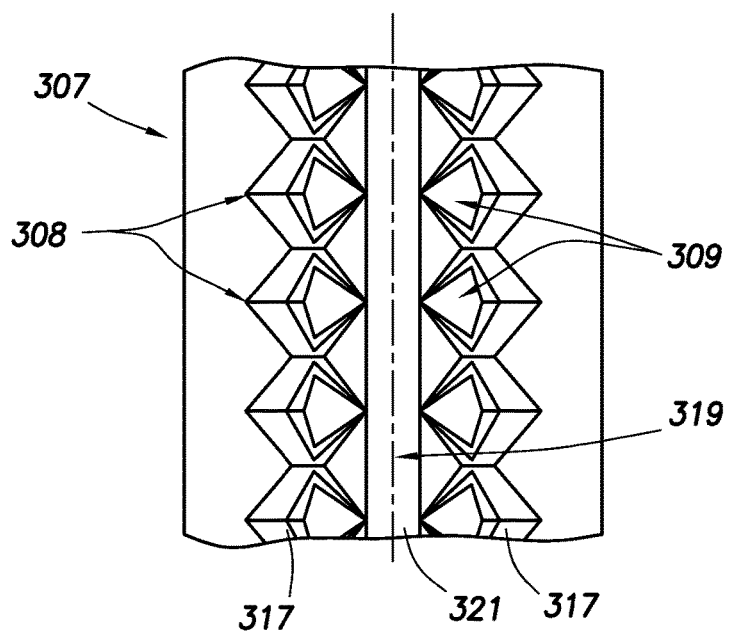

FIG. 13A depicts a prior art seal 305 with a textured surface 307 on the inside diameter. FIG. 13B depicts a detailed view of the textured surface 307. The pattern of the textured surface 307 includes pockets 309 with jagged edges 308 that may trap lubricant reducing friction and heat generation. A central rib 319 extends along a central line of the inner diameter 321 with mirrored, non-directional patterns 317 on each side thereof. Configurations for seals and textures that may be used are provided in U.S. Pat. No. 4,619,534, the entire contents of which are hereby incorporated by reference.

Figure 14A:
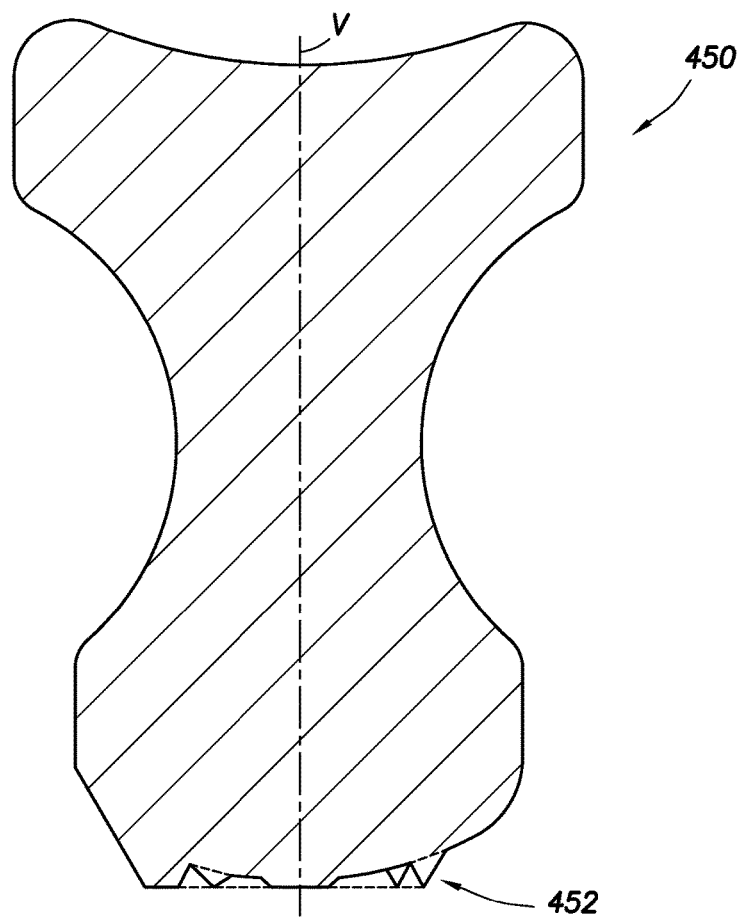
FIGS. 14A-14B depict cross-sectional and end schematic views, respectively, of another alternate drill bit seal having a textured surface.
Figure 14B:
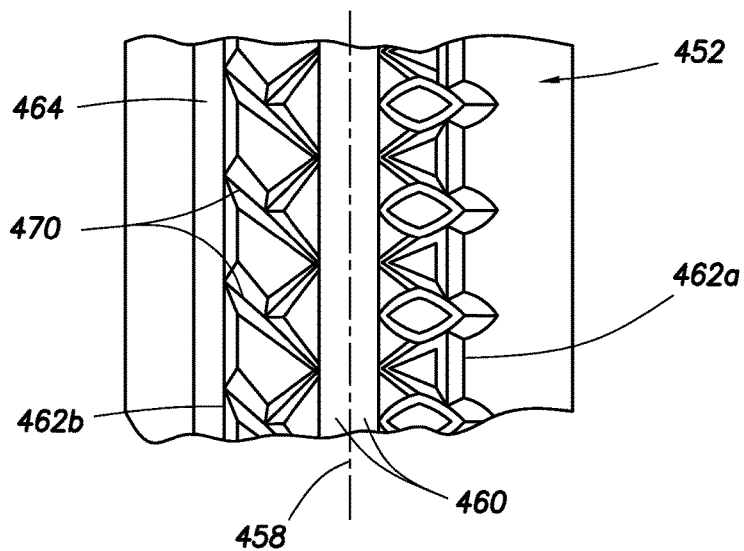

FIGS. 14A and 14B depict an alternate seal 450 usable with the drill bits described herein. The seal 450 may be similar to the seal 350 previously described, except that no spring pocket, spring or lubrication groove is provided. In this version as shown, the seal 450 has symmetric configuration about a longitudinal axis V, and a textured surface 452 along an inside diameter 458. The seal 450 may also have a cross-section similar to the other seals provided herein.

The textured surface 452 may be provided to facilitate sealing of the seal 450 to the seal land 44 along the inside diameter 458. FIG. 14B depicts another textured surface 452 that may be used to facilitate expulsion of abrasive particles during operation. The textured surface 452 has a central rib 460 along a central line of the inside diameter 458 to maintain a positive seal against the seal land. A grease side of the textured surface 452 has a non-directional pattern 462a. A mud side of the textured surface 452 has a directional pattern 462b with a side lip 464 on a mud side thereof.

The side lip 464 is positioned along the mud side to deflect abrasive particles to prevent movement of such particles to the grease side of the seal. The mud side textured pattern 462b has ribs 470 for trapping lubricant and for sealing engagement with the seal land 44. The ribs 470 may be provided at an angle to facilitate expulsion of abrasive particles. The angle of the textured ribs 470 may be, for example, about 45 degrees from the longitudinal axis V. Should the side lip 464 wear away, the texturized ribs 470 may be positioned at an angle to expel particles.

The seals 50, 350 and 450 may have a body made up of, for example, a high temperature elastomer, such as fluorocarbon (FKM) (e.g., VITON™); perfluoroelastomer (FFKM) (e.g., KALREZ™); or tetrafluoroethylene propylene (FEPM) (e.g., AFLAS™)

The dimensions of the seals 50, 350 and 450 may be configured to allow the seal 350 to deform as shown in FIGS. 9 and 10. Various features of the seals may be interchangeable. For example, the spring of seal 350 may be used in seal 50 and/or the asymmetric cross-section of seal 50 may be used in the seal 350. As shown, the seals 50 and 350 have asymmetric, longitudinal configurations that provide additional support on (or force to) the grease side of the seal.

In some cases, the seals may be configured to accept high pressures (e.g., hydrostatic and/or cuttings) and deform such that the mud lobe and grease lobe remain in contact with seal land 44. The air gap may be reduced and/or eliminated as the seal is pressed against the grease wall under downhole pressure. Such configurations may also be used to prevent lifting of the ear and/or lobe that may occur in some configurations as shown, for example, in FIG. 5.

In operation, the seals 50, 350 and 450 may be positioned in the drill bit 10 or 100 with pressure applied thereto by hydrostatic pressure and/or cuttings. Under even extreme pressures (e.g., more than about 1000 kg/cm), the seals may maintain a mud lobe and grease lobe thereof against a landing thereby maintaining a seal between the bearing spindle 16 and the rolling cutter 18.

Whereas the present disclosure has been described in particular relation to the drawings attached hereto, it should be understood that other and further modifications apart from those shown or suggested herein, may be made within the scope and spirit of the present disclosure.

What is claimed is:

1. A seal for a rolling cutter drill bit, the seal comprising:
    an annular seal body extending circumferentially about a central axis, wherein the seal body includes a radially inner surface proximal to the central axis and facing the central axis, a radially outer surface distal the central axis and facing away from the central axis, a mud side extending radially from the radially outer surface to the radially inner surface, and a grease side positioned laterally opposite the mud side and extending radially from the radially outer surface to the radially inner surface;
    wherein the grease side of the seal body includes an annular pocket, wherein the annular pocket is defined by a recess formed in a concave surface extending along the grease side of the seal body;
    an annular spring seated in the annular pocket.

2. The seal of claim 1, wherein the annular pocket and the spring disposed therein are positioned proximal the radially inner surface of the seal body and distal the radially outer surface of the seal body.

3. The seal of claim 2, wherein the seal body includes a grease cavity disposed along the grease side, wherein the annular pocket and the spring disposed therein are radially positioned between the grease cavity and the radially inner surface of the seal body.

4. The seal of claim 2, wherein the spring is in tension and is configured to squeeze the seal body radially inward relative to the central axis.

5. The seal of claim 4, wherein the spring is a garter spring.

6. The seal of claim 1, wherein the seal body further comprises:
   a mud cavity disposed along the mud side;
   a grease cavity disposed along the grease side;
   a mud lobe at an intersection of the radially inner surface and the mud side; and
   a grease lobe at an intersection of the radially inner surface and the grease side.

7. The seal of claim 6, wherein the seal body further comprises a lubrication groove extending along the radially inner surface, wherein the lubrication groove is positioned between the mud lobe and the grease lobe.

8. The seal of claim 1, wherein in a cross-section of the seal body taken in a plane containing the central axis and oriented parallel to the central axis, the seal body has a centerline laterally positioned between the mud side and the grease side;
   wherein in the cross-section of the seal body, a center of the spring is positioned between the centerline and the grease side.

9. The seal of claim 1, wherein the seal body has a total height L6 measured radially from the radially inner surface to the radially outer surface;
   wherein in a cross-section of the seal body taken in a plane containing the central axis and oriented parallel to the central axis, a distance L8 measured radially from the radially inner surface to a center of the spring is 20% to 40% of the total height L6.

10. The seal of claim 9, wherein the seal body further comprises a grease lobe at an intersection of the radially inner surface and the grease side, wherein the grease lobe is radially positioned between the radially inner surface and the annular pocket;
    wherein in a cross-section of the seal body taken in a plane containing the central axis and oriented parallel to the central axis, the seal body has a centerline laterally positioned between the mud side and the grease side;
    wherein in the cross-section of the seal body, a distance L7 measured laterally from the grease side along the grease lobe to the center of the spring is 50% to 90% of a distance L9 measured laterally from the grease side along the grease lobe to the centerline.

11. The seal of claim 1, wherein the seal body includes a mud cavity disposed along the mud side and a grease cavity disposed along the grease side laterally opposite the mud cavity;
    wherein in a cross-section of the seal body taken in a plane containing the central axis and oriented parallel to the central axis, the seal body has an intermediary width W5 measured laterally from the mud cavity to the grease cavity and a minimal thickness t measured from the mud cavity to the annular pocket;
    wherein the minimal thickness t is less than the width W5.

12. A rolling cutter earth boring drill bit for drilling a borehole in an earthen formation, the drill bit comprising:
    a leg;
    a bearing spindle extending from a cutter end of the leg;
    a rolling cutter rotatably mounted to the bearing spindle with a seal groove therebetween; and
    a seal disposed in the seal groove, wherein the seal comprises:
       an annular seal body disposed about a central axis, wherein the seal body includes a radially inner surface engaging the bearing spindle, a radially outer surface engaging the rolling cutter, a mud side extending radially from the radially outer surface to the radially inner surface, and a grease side positioned laterally opposite the mud side and extending radially from the radially outer surface to the radially inner surface;
       wherein the grease side of the seal body includes an annular pocket defined by a recess formed in a concave surface extending along the grease side of the seal body;
       an annular spring seated in the annular pocket, wherein the spring is configured to radially compress the radially inner surface of the seal body against the bearing spindle.

13. The drill bit of claim 12, wherein the seal body includes a mud lobe positioned between the mud side and the radially inner surface and a grease lobe positioned between the grease side and the radially inner surface; and
    wherein the seal body has an asymmetrical longitudinal cross-section such that, when compressed in the seal groove under downhole pressure, the mud lobe and grease lobe are configured to maintain contact with a seal land of the seal groove.

14. The seal of claim 12, wherein the annular pocket and the spring disposed therein are positioned proximal the radially inner surface of the seal body and distal the radially outer surface of the seal body.

15. The drill bit of claim 12, wherein the spring is a garter spring.

16. The drill bit of claim 12, wherein in a cross-section of the seal body taken in a plane containing the central axis and oriented parallel to the central axis, the seal body has a centerline laterally positioned between the mud side and the grease side;
    wherein in the cross-section of the seal body, a center of the spring is positioned between the centerline and the grease side.

17. The drill bit of claim 16, wherein the seal body has a total height L6 measured radially from the radially inner surface to the radially outer surface;
    wherein in a cross-section of the seal body taken in a plane containing the central axis and oriented parallel to the central axis, a distance L8 measured radially from the radially inner surface to a center of the spring is 20% to 40% of the total height L6.

18. The drill bit of claim 17, wherein the seal body further comprises a grease lobe at an intersection of the radially inner surface and the grease side, wherein the grease lobe is radially positioned between the radially inner surface and the annular pocket;
    wherein in the cross-section of the seal body, a distance L7 measured laterally from the grease side along the grease lobe to the center of the spring is 50% to 90% of a distance L9 measured laterally from the grease side along the grease lobe to the centerline.

19. The drill bit of claim 17, wherein the seal body includes a mud cavity disposed along the mud side and a grease cavity disposed along the grease side laterally opposite the mud cavity;

wherein in a cross-section of the seal body taken in a plane containing the central axis the seal body has an intermediary width W5 measured laterally from the mud cavity to the grease cavity and a minimal thickness t measured from the mud cavity to the annular pocket;

wherein the minimal thickness t is less than the width W5.

20. The seal of claim 17, wherein the seal body further comprises:
- a mud cavity disposed along the mud side;
- a grease cavity disposed along the grease side;
- a mud lobe engaging the bearing spindle proximal the mud side; and
- a grease lobe engaging the bearing spindle proximal the grease side.

* * * * *